United States Patent [19]

Ardry et al.

[11] 3,919,186

[45] Nov. 11, 1975

[54] METHOD OF RECOVERING CYTOBIOTIC GLOBULIN FROM SKIN TISSUE

[75] Inventors: Robert Ardry, Clamart; Michel Robilliart, Paris, both of France

[73] Assignee: Societe Anonyme dite: Omnium Financier Aquitaine pour l'Hygiene et la Sante (SANOFI), Courbevoie, France

[22] Filed: Dec. 4, 1972

[21] Appl. No.: 312,021

Related U.S. Application Data

[63] Continuation-in-part of Ser. No. 111,760, Feb. 1, 1971, abandoned, which is a continuation of Ser. No. 766,313, Oct. 9, 1968, abandoned.

[30] Foreign Application Priority Data

Oct. 10, 1967  France .......................... 67.123862

[52] U.S. Cl. ................ 260/112 R; 424/85; 424/88; 424/95; 424/177
[51] Int. Cl.² ........................................ C07G 7/00
[58] Field of Search ................................ 260/112 R

[56] References Cited
OTHER PUBLICATIONS

Chem. Abstracts, Vol. 71, 1969, Ardry et al., 84468k.

Chem. Abstracts, Vol. 73, 1970, Ardry et al., 64435k.

*Primary Examiner*—Howard E. Schain
*Attorney, Agent, or Firm*—Karl F. Ross; Herbert Dubno

[57] ABSTRACT

A method of obtaining cytobiotic globulins for the treatment of skin conditions involving edema and lesions, from healthy slaughterhouse animals wherein the skin tissues of the animals are, after maceration and purification, subjected to elution at a low pH, followed by increase in the pH to form a precipitate which is discarded. Thereafter further precipitation is induced to separate the globulin-containing fraction. This precipitate is purified by dialysis and converted into a powder or used in a solution form. The product has utility in the treatment of animal skin lesions, skin conditions such as burns and the like. Immune globulins can be made using the same steps by recovering the globulin principle from immunized blood, absorbing the immune globulins or purified organs from the slaughterhouse and then eluting the globulins from the absorbing tissue and treating as previously indicated.

1 Claim, No Drawings

METHOD OF RECOVERING CYTOBIOTIC GLOBULIN FROM SKIN TISSUE

CROSS-REFERENCE TO RELATED APPLICATION

This application is a continuation-in-part of now abandoned application Ser. No. 111,760 filed Feb. 1, 1971 as a continuation of Ser. No. 766,313 filed Oct. 9, 1968 and now abandoned.

FIELD OF THE INVENTION

Our present invention relates to a cytobiotic globulin extract for the treatment of skin conditions involving edema, pain and lesions, pharmacological compositions containing these globulins for the treatment of burns and the like, a method of treatment of such skin conditions using the globulin and a method of making these compositions.

BACKGROUND OF THE INVENTION

While it has long been known that extracts from living organisms, and especially animal organs, contain recoverable substances with therapeutic properties for the treatment of animals and humans, prior-art systems for recovering substances with therapeutic properties have heretofore concentrated, mostly, on the extraction of hormones and hormone-like products for this purpose.

SUMMARY OF THE INVENTION

We have found that it is possible to recover cytobiotic or cytogenic products from animal skin tissue or dermal layers which have a surprising effect upon dermal tissue with respect to regeneration and revivification of the tissues and cells thereof. The compounds or compositions with which the present invention is concerned are globulins or proteinaceous materials which manifest cytogenic or cell-regeneration characteristics upon recovery from animal skin tissue in the manner set forth hereinbelow and when used as described.

Our invention is of special importance in connection with skin-tissue regeneration or the promotion of new cell growth to replace removed or dead tissue upon local application or parenteral administration. More specifically, the products of the present invention have utility in the preparation of cosmetic creams, lotions, salves or ointments for topical application to improve skin tone and cell growth at the dermis of the patient, to prevent formation of scarified tissue, to promote healing of skin lesions, to promote regeneration of dermal tissue, to reduce edema and exudative conditions of the skin and to induce regeneration of skin and/or cell growth in the region of superficial wounds, slight to severe burns and the like.

It is the principal object of the present invention, therefore, to provide an improved method of obtaining from the skin tissue of animals, cytobiotic and cytogenic globulins having dermal-cell growth inducing or cell-regenerating characteristics when used in the treatment of mammalia including human patients.

Another object of our invention is the provision of a method of obtaining a cytobiotic globulin for the treatment of skin lesions, wounds, burns and the like for promoting dermal cell growth or regeneration, reducing edema, limiting pain and diminishing exudation.

Yet another object of this invention is the provision of a method of treating patients to promote dermal cell growth and regeneration.

Still a further object of our invention is to provide improved compositions for such treatment.

SPECIFIC DESCRIPTION OF THE INVENTION

We have found that it is possible, through a series of relatively simple steps, to obtain from animal skin tissue and, preferably, from skin tissue obtainable from healthy young animals and foetuses at the slaughterhouse, proteinaceous materials or globulins which, in the extracted or recovered form, manifest a high degree of specific cytobiotic or cytogenic activity when used in the treatment of skin conditions of living patients of animal family.

Our invention yields, in the final analysis, cytobiotic globulins in the form of a greyish-white powder which can be used in sera or in various excipients for the direct treatment of the animal subject, or indirectly in accordance with another aspect of this invention, to derive compounds which have the highly specific cytobiotic property mentioned earlier. When the terms "cytobiotic" and "cytogenic" are used herein, it should be understood that it is intended to include several forms of dermal cell activity, including the promotion of dermal cell growth and thus the regeneration of dermal tissue constituted by the cells whose growth is promoted. The expressions also are intended to connote the revivification of dermal tissue or improvement of tissue tone either by dermal cell-growth promotion or by the promotion of new dermal cell formation, etc.

More specifically, we have found that it is possible to obtain from healthy-animal or foetal skin tissue as obtained from slaughterhouses or like sources, a proteinaceous extract or globulin with a cytobiotic activity analogous to that of antibody compositions of the type prepared from animal sera of host animals which have been inoculated with an infectious or other pathological substance to induce the formation of such antibodies. In other words, the globulins of the present invention have an antibody-like effect without previous treatment of the animal from which the globulin is derived. The globulins have no antagonistic characteristics and are nontoxic in the treatment of humans or other animals and do not induce, in turn, rejection phenomena, nor do they manifest specific tropism for skin tissue but rather exert a regenerative action upon such tissues so as to restore or promote restoration of deteriorated or dead tissue and promote cell growth, regeneration and tissue-tone improvement to a surprising degree.

GENERAL DESCRIPTION OF THE METHOD

A. Preparation of Animal Skin Tissue

The method of recovery of the globulins of our present invention comprises initially the subdivision of the healthy animal or foetal skin tissue or living dermal tissue by chopping, mincing or grinding, followed by washing of the subdivided mass with a saline solution (preferably 0.9% aqueous sodium chloride by weight) to eliminate residual blood. While the tissue preferably is used directly after it is removed from the animal carcass at the slaughterhouse, we have also found it to be feasible to temporarily store the tissue by freezing it immediately after it has been taken from the carcass. In either case, the subdivision and blood-removal steps proceed as described.

After eliminating any residual blood, the subdivided tissue is pulverized in a mixer, blender or other similar apparatus and is then suspended in ten times its weight in a 0.9% by weight aqueous saline solution at ambient (room) temperature. The suspension is agitated for a period of 1 hour, whereupon the insoluble portion is withdrawn and subjected to freezing at temperatures below −20°C to effect salt rupture. This frozen insoluble fraction is again suspended in about 10 times its weight of 0.9% by weight aqueous sodium chloride solution, agitated with the insoluble part being recovered, and washed until the washing liquid no longer contains any dissolved materials.

B. Preparation of Initial Protein Extract.

We have also noted that several techniques may be used to break the chemical bond between the globulin proteins and the remaining tissual structure in the purified tissues obtained by the foregoing treatment and thereby allow elution of the cytobiotic globulin from this tissue.

Thus, we heat the tissue to a temperature of 60°C and maintain it at this temperature for a period of 15 minutes during which time the tissue is dispersed and agitated in at least one of the following elution solutions:

B1. an aqueous solution containing 10% by weight sodium salicylate in distilled water;

B2. an aqueous solution containing 15 to 30% by weight of urea in distilled water; while the urea concentration may depend upon the organ treated, any proportion of this range has been found to allow recovery of some of the cytobiotically active globulins; and B3. a buffer solution of variable ionic strength with a pH of 9.5 to 11 (in the alkaline range as obtainable with a phosphate-based buffer) or a pH of 2.8 to 3.2 (in the acid range as controlled by a citrate-based buffer).

Upon conclusion of this 15-minute elution period, cytobiotic proteins or globulins are found in the elution liquid.

C. Elimination of Impurities from Extract

According to an essential feature of this invention, the elution step is initially carried out with an elution solution at a pH of $3.1 \pm 0.1$ and is followed by an increase in the pH to about 6 to eliminate the noncytobiotic portion.

In practice, this step is effected by treating the insoluble and macerated tissue, after washing to eliminate all soluble substances in the washing liquid, with two to three times its weight of a sodium citrate solution at a pH of $3.1 \pm 0.1$, this pH being established by addition of hydrochloric acid to the sodium citrate solution. The ionic strength of this solution should be about 0.15 M.

The elution solution, in which the tissue is suspended, is permitted to stand for about an hour at room temperature and is then centrifuged, and the supernatant portion decanted.

This supernatant portion is brought to a pH of about 6 by the addition of sodium hydroxide, whereupon a precipitate is formed. The precipitate is removed by centrifugation and filtration of the liquid which is recovered. It has been found that this prior elimination of the precipitate is an essential step in the subsequent recovery if the cytobiotic fraction is to yield a pure product.

D. Recovery of Cytobiotic Principle

The filtrate is then brought to a pH of about 7 with sodium hydroxide and combined with sufficient ammonium sulphate $(NH_4)_2SO_4$ to yield a concentration of about 1.85 M (corresponding to an aqueous solution containing 45% by weight of the salt) at 25°C.

This solution is permitted to stand for a period of several hours, whereupon the precipitate which has been formed is collected by filtration and dissolved in the precise quantity of distilled water necessary to yield total solubilization at room temperature. This globulin solution is dialyzed against distilled water to eliminate all traces of the ammonium salt, whereupon a fresh precipitate generally forms and is removed.

E. Recovery of Globulins

The supernatant liquid (dialyzate) from this separation of impurities after centrifugation can be treated in accordance with one of two treatment steps which are distinguishable by yielding crude cytobiotic globulins, i.e., globulins mixed with proteins having no cytobiotic or cytogenetic activity or only limited activity, or by yielding highly active cytobiotic globulin of a high degree of purity and activity.

C1. In the first case, the dialyzed centrifuged supernatant liquid is filtered and lyophilized to yield a powder which need not undergo further purification and constitutes a crude cytobiotic composition which can be mixed with an excipient for skin treatment or the like.

C2. In the second case, i.e., when highly active globulins of high purity are desired, the dialyzed centrifuged supernatant liquid is mixed with sodium monophosphate until its concentration is about 0.0175 M (corresponding to a pH of 6.3). This solution is now subjected to purification in a column of diethylaminoethylcellulose, dispersed in a sodium monophosphate buffer solution at 0.2 M (pH 6.3), and washed with 0.0175 M sodium monophosphate solution (pH 6.3). The final portions are dispersed with the same buffer solution. The effluent contains the purified cytobiotic globulin and consists essentially of globulins 1 g.G. After further dialysis against distilled water and filtration, the globulin solution is lyophilized to yield the aforedescribed powder of high purity.

CHARACTERISTICS OF THE GLOBULINS

The globulin powder is characterized by a greyish-white color, light weight and high solubility in water and physiological sera serving for parenteral injection. The cytobiotic character of this product is illustrated below in a series of examples, although it may be noted that they generally can be introduced into any excipient commonly employed for application to the skin in human and other animal species.

SOURCES OF THE GLOBULIN

The product, derived from living dermal tissue as noted above, can be incorporated into creams, salves, lotions or dispersive excipients (emulsions and milks). Best results are obtained in the treatment of human epidermal tissues to revitalize them and improve tissual tone when the original dermal tissue from which the globulin is derived is obtained from the fetuses of an animal. The stimulating effect of the product is noticeable in a decrease of the dead-cell formation on the skin and in improved vigor in cell growth in the lower dermal layers as well as in a shine or skin tone charateristic of invigorated growth.

IMMUNE GLOBULINS

We have also found that it is possible to provide a specific cytobiotic globulin, i.e., one that has been corrected for immunological response, using techniques substantially similar to those described above and capable of producing a globulin which can be employed for administration to humans and other animals with minimum adverse reaction.

The concept upon which this is based derives from our finding that, when the skin tissue is used to produce an antigenic extract for injection into a blood-circulating animal, usually a horse, the blood undergoes the usual immunological change and antibody formation. The blood can thus be recovered and subjected to globulin extraction to produce a globulin which is an immunological globulin or immune globulin. When the immune globulin is placed in suspension with a macerated portion of the original skin tissue, the latter adsorbs a characteristic globulin fraction from the product obtained from the horse's blood and the adsorbed globulin is recovered by the process described earlier. The product may be used in excipients for topical applications. A. Preparation of Immune Globulin Plasma In more specific terms, this technique for obtaining solutions of cytobiotic globulins by recovering those of the greatest activity can be considered in two basic steps, namely isolation of the immune globulin and selection of the most effective globulin from the collection of immune globulins produced in the first stage.

Thus, an anitgenic extract is produced in the usual manner from the skin tissue of the slaughterhouse animal or foetus. After it has been prepared as described earlier the antigenic extract constituted by the soluble portion of the macerated tissue in an aqueous saline solution is then injected into the host animal (horse), and the blood of this immunized animal is thereafter collected in accordance with usual serum-recovery techniques, in an anticoagulant. The plasma is then separated and treated by an ammonium sulphate procedure or a metallic salt procedure, as discussed below.

B. Removal of Impurities

B1. In the ammonium sulphate technique, the plasma is combined with an aqueous solution of saturated ammonium sulphate (1.025 M in the ammonium salt) to yield a precipitate which is removed by centrifugation and decanted. The ammonium sulphate concentration is then raised to 1.56 M by the addition of a saturated solution of the salt, and this precipitate collected and washed with 1.56 M aqueous ammonium sulphate. The washed precipitate is dispersed in distilled water and subjected to dialysis against distilled water to complete disappearance of ammonium salt and yields a globulin capable of undergoing selection in the second stage.

B2. In the metal-salt technique, the plasma is diluted with three volumes of aqueous sodium chloride with a concentration of about 0.9% by weight, although the precise concentration used will depend upon the animal species from which the blood is derived. A zinc salt is then added to a concentration of 10 millimoles. The resulting precipitate is separated by centrifugation and filtration. The zinc salt is then added to the filtrate to raise the concentration to 18.6 millimoles and a basis ammonoacid is added to a concentration of 0.43 millimoles. After the centrifugation, the new precipitate is recovered, washed with distilled water (one volume for every three volumes of the plasma initially used) and the paste dialyzed in fresh distilled water for 24 hours against distilled water. Then the product may undergo the selection stage mentioned earlier.

C. Globulin Selection

Selection may be done on a two-part basis, in the first, the total immune protein is treated in a solution by adding sodium chloride and sodium hydroxide to the suspension resulting from dialysis against distilled water so that the proteinic concentration is finally about 5% by weight, the pH is about $7.3 \pm 0.3$ and the ionic strength is about 0.06.

To the mixture in which some of the proteins are insoluble, Nuchar C190 filtering-aid active-carbon powder is added in an amount of 1 to 2% weight, the mixture being permitted to stand. After a period of 1 hour, the liquid is decanted and subjected to centrifugation; the supernatant liquid being filtered on a clarifying filter.

The solution is put into contact with the insoluble residue of homogenized tissue from the tissue used for the formation of the antigenic product used to inoculate the horse. The homogenate, which is specific to the antibodies contained in the globulin, is previously subjected to treatment with a citrate solution having a straight concentration of 0.15 M and a pH of $3.1 \pm 0.1$; the homogenate is thereafter washed with the solution of 9.15 M sodium chloride buffered to pH $7.5 \pm 0.3$.

After standing in contact with the immune globulin solution, the insoluble tissue homogenate containing absorbed globulins is separated from the liquid by decantation and eluted with a citrate solution (0.15 M to pH 3.1) with the eluate being neutralized to pH 7.5±0.3. The insoluble part is removed and the solution subjected to dialysis against the sodium chloride solution of 0.15M. When the protein concentration is low, we lyophilize the dialyzed solution and then dissolve the lyophilized protein in sodium chloride solution (0.15 M) with a pH adjusted to 7.5. The globulin solutions are subjected to filtration through milliporous sterilized patches (in a sterile atmosphere) and lyophilized.

CONDITIONS TREATED (UTILITY)

The cytobiotic globulin is topically applied in the treatment of the following conditions in human patients and for the purposes listed below:
  a. Facial erythema (allergic reaction)
  b. Papillary edema (resulting from massage)
  c. Cicatrices
    1. Surgical operation
    2. traumatic (accident)
    3. infection (seborrhia, staphylococcus, acne, burns
  d. Paraperatosis
  c. Perleche
  f. Eczema (seborrheic, lichenoid)
  g. Burns
  h. Paranasal Herpes
  i. Psoriasis
  j. Neuro-dermital conditions

SPECIFIC EXAMPLES

Preparation of Globulin for Skin Treatment

EXAMPLE I

From foetal skin from healthy animals obtained at a slaughterhouse, we prepare a cytobiotic globulin as follows:

The dermal tissue obtained as needed is macerated with 0.9% sodium chloride aqueous solution, prior to pulverization, the tissue being suspended in ten times its weight of 0.9% by weight sodium chloride in distilled water. After agitation and remaining in contact with the saline solution for a period of 1 hour, the insoluble portions are recovered by filtration and subjected to deep freezing below −20°C to cell rupture. The insoluble portions are gradually brought to room temperature and suspended again in 0.9% by weight aqueous sodium chloride in an amount of 10 times the weight of the solids. The solids are removed and washed with distilled water until the washing liquid is found to contain no further trace of soluble substance.

The macerated tissue, purified and prepared as described above, is heated at a temperature of 60°C for a period of 15 minutes in a 10% by weight sodium salicylate solution in distilled water. Another portion is heated at 60°C for a period of 15 minutes in a 20% by weight solution of urea in distilled water, while two additional portions are heated at 60°C for 15 minutes in a phosphate buffer at a pH of 9.5 to 11 and of 2.8 to 3.2 in a citrate buffer. The major portion is, however, treated at 60°C for 15 minutes with a solution of straight buffer (sodium citrate) brought to a pH of 3.1 ± 0.1 and used in about two to three times the weight of the tissue treated. The pH is adjusted with hydrochloric acid. In each case, the elution yielded a solution which was treated as indicated below, although by far the best yield was obtained with the lastmentioned step.

After the elution solution is permitted to stand in contact with the tissue for a period of an hour at room temperature (about 25°C), the mixture is centrifuged and the supernatant liquid removed, brought to a pH of 6 with sodium hydroxide and subjected to centrifugation and filtration to remove a precipitate which is formed by this change in the pH. The filtrate is then brought to pH 7 with the addition of further sodium hydrooxide, and ammonium sulphate is added to a concentration of 1.85M (as 45% aqueous solution of the salt at 25°C).

This new mixture is permitted to stand for three hours, whereupon the freshly formed precipitate is collected and dissolved in the precise amount of distilled water required for complete solubilization. This solution is dialyzed against distilled water to complete disappearance of the ammonium salt and a new precipitate is observed. This precipitate is separated from the dialyzed eluate by centrifugation.

The eluate is next combined with sodium monophosphate such that the concentration of this salt is 0.0175 M therein (pH 6.3), the solution being then passed through a diethylaminomethylcellulose column and dispersed in a sodium monophosphate buffer with a concentration of 0.2 M at pH 6.3, washed with a monophosphate buffer at a concentration of 0.0175 M (pH 6.3) and the final portions of the eluate passing through the column are displaced with the same buffer. The effluent solution contains the cytobiotic globulin 1 g.G.

Upon this last-recovery solution, dialysis is again carried out, followed by filtration to remove any solid, and then lyophilized to produce a dry residue consisting of the active globulin.

PREPARATION OF TOPICAL APPLICATION (EXAMPLE I-A)

The solid globulin is dissolved in distilled water to a concentration of 5% by weight to produce a cytobiotic-globulin solution which is incorporated in a skin-revitalizing cream. 4 g of this solution are mixed with 5.2 g polyoxyethleneoleic glyceride and 22 g of glycolstearate; glycerin and distilled water in equal parts are then combined with the mixture to a total of 100 g. The cream is blended in the usual manner. When applied to the skin of test animals, it was found that dead tissue was rapidly sloughed and fresh skin growth promoted. Skin tone was remarkably improved. The cream was found to have similar effect in the treatment of human skin and dry-skin conditions.

When the treatment agent (Example 1-A, E-10) was used to treat human patients for the conditions set forth above (topical application as required), relief from pain was observed in 75% of superficial-burn cases and substantially all in which application was made soon after the burn was incurred. When applied before the first hour it limited the appearance of edema and facilitated its reabsorption and promoted healing, leading to good plastic/esthetic healed wounds. There were, on a local scale, no allergic reactions, inflammations or evidences of pain on application. The topically applied product showed no effect on the hepato-renal function, on the circulatory system, on the nervous system or on the blood composition or coagulation.

DERMAL MILK (EXAMPLE I-B)

A dermal milk was prepared by intimately combining 4 g of the cytobiotic solution of Example I-A, 10 g of polyoxyethyleneoleic glyceride, 10 g of polyethyleneglycolstearate and 0.1 g sodium methylparaoxybenzoate, the mixture being combined with water to a total of 100 ml. The suspension was found to be excellent in the regeneration of skin tissue as noted in connection with Example I-A.

PHARMACOLOGICAL PROPERTIES AND EFFICACITY

The cytobiotic globulin powder prepared as described in Example I was greyish-white, light-weight, highly soluble in water and soluble in physiological serum. Tests of the cytobiotic globulins were carried out to determine its action upon embryonic-tissue culture (cytogenic effect), upon regeneration (cytoregenerative effect) and the toxicity and efficacity of the product in the treatment of animals and humans.

The embryonic-tissue culture is prepared in the usual manner and has high sensitivity to cell-reproduction-influencing substances. To the culture in a petrie dish is added 8 drops of a 1% solution of the globulin powder in distilled water per ml of the medium. When the tissue culture is embryonic tibia, the daily growth is photographically recorded and contrasted with a control culture. A decrease in the growth of malformed tissues (70% in the control and only 20% in the test) and an increased growth rate by comparison with the control is observed. When labeled methionine containing $S^{35}$ is added to the nutritive medium, the radioactive sulfur is found in the new cell growth to a much higher degree in the test culture than in the control.

The cell regeneration or healing action of the globulins was found to be significant. When tested on bone lesion in rats, cytobiotic globulins made from bone tissue and rejected into the situs of the lesion in a physiological serum showed a scar-formation speed twice as great as in control rats in which only the serum was injected.

The healing of wounds on the skin was also promoted with the use of the cream and emulsion described above.

A number of other properties of the cytobiotic globulins were discovered, namely, that they protect rodents (e.g., mice) against the toxic effects of ammonium chloride, that they accelerate the metabolism of rats on an unbalanced and deficient diet, that they decrease the reaction speed of animals in physical activity when normal feeding is resumed, that they have a protitoanabolism effect, that they are without androgenic action, that they reduce the development of muscular fatigue, that they reduce rabbit blood pressure and accelerate the healing of burn wounds. In toxicity tests, the globulins have shown no acute toxicity in mice and guinea pigs, no chronic toxicity in rabbits and guinea pigs, no antibody reaction when tested in gelose against various human, amniotic and porcine cells, no antibody reaction against a macerated mixture of amniotic human cells and pig-kidney cells and no teratogenic activity in the mouse, rat or rabbit.

EXAMPLE I-C

A pharmaceutical composition for parenteral injection can be prepared in the form of ampoules containing 2 ml of physiological serum and 10 mg of the specific globulin powder obtained as in Example I from the skin of slaughterhouse animals.

EXAMPLE I-D

A solution for topical or local application can include 0.6 g of the powder, specific or polytissual globulins of Example I and sufficient distilled water or physiological serum to bring the solution to 100 ml. When used to treat humans, the ampoule dosage has been used effectively in 2 to 3 injections per week with the length of treatment of about 3 weeks. The injections have been shown to reduce aging effects in 80% of the test cases and repetition of the treatment has not manifested any difficulties with sensitization. The solution has also been found to be useful in suppositories.

IMMUNE GLOBULINS (EXAMPLE II)

Six liters of immunized horse blood are collected with a 100 ml of 33% of aqueous solution of trisodium citrate anticoagulant. The horse blood is obtained from a horse injected with the liquid phase removed from the maceration step of Example I.

A saturated solution of ammonium sulfate in water is made up and added in an amount of one volume of each three volumes of the resulting plasma and the resulting precipitate is removed by centrifugation and decanting of the supernatant lquid. To this liquid we add 220 ml of a saturated solution of ammonium sulfate per liter, thereby forming a second precipitate which is washed with 38 parts by weight of a solution of ammonium sulfate and 62 parts by weight of distilled water.

The washed precipitate is dispersed in distilled water and dialyzed against distilled water to complete disappearance of ammonium sulfate. The resulting suspension, at a proteic concentration of 5% is subjected to dialysis after the addition of 35 g of sodium chloride for each liter of the suspension, the pH being raised to 7.5 ± 0.3 with sodium hydroxide. The dialysis at an ionic strength of 0.06 eliminates inactive proteins and produces a globulin solution which is treated with 1 to 2% by weight of active carbon (NUCHAR C190) and permitted to stand for about an hour, followed by centrifugation, decantation and filtering of the supernatant liquid in a clarifying filter.

A homogenate of the same tissue is purified generally as described in Example I prior to elution and permitted to stand with the last mentioned filtrate whereupon the solids are removed from solution, the latter containing nonspecific, non-corrected globulins. The solid portions, upon which the antibody-corrected globulins have been absorbed, is subjected to elution with a sodium citrate solution of 0.1 M at pH 3.1 with the eluate being raised to a pH of 7.5 ± 0.3. The insoluble portion is removed from the solution which is dialysed against a sodium chloride solution at 0.15 M.

This solution is filtered on a sterilized milliporous filter in a sterile atmosphere and can be lyophilized to yield the globulin powder having the properties mentioned earlier, but preferably is then brought to pH 6 by the addition of NaOH and further treated as described in Example I. The elution techniques thereof can also be used upon the solid portions.

EXAMPLE III

One volume of horse plasma, obtained as in Example II is combined with three volumes of 0.9% sodium chloride solution to which 30 ml of 9.6% zinc sulfate solution in diluted water is added per liter of the horse plasma/sodium chloride mixture. After discarding of the precipitate each liter of the filtrate is combined with 21 ml of an aqueous solution of zinc sulfate at 9.6% concentration and 5 ml of a 0.65% aqueous solution of glycine. Dialysis is carried out as in Example II with final recovery of the globulins as there described.

EMBRYOGLOBULIN (EXAMPLE IV)

A topical application with the same effectiveness as described for the product of Example I-A (E-10) is obtained by preparing, from dermal tissue of pig embryos obtained upon the slaughter of hogs, an antigenic immunological serum as described in Example I prior to elution of the globulins, injecting a horse therewith and treating the blood of the horse as described in Example II and obtaining the globulin powder. The application consisted of

| | |
|---|---|
| 600 mg | globulin powder |
| 180 mg | glycine |
| 780 mg | NaCl |
| 100 ml | sterile water |

We claim:
1. A method of making a cytobiotic globulin for the treatment of a human burn condition, erythemia, papillary edema, cicatrization, parakeratosis, perleche, eczema, herpes, psoriasis, seborrhia, acne, staphylococcal infection, neuro-dermital or senile-skin condition, comprising the steps of:
   macerating skin tissue of a healthy slaughterhouse animal or foetus in an aqueous solution containing 0.9% by weight sodium chloride to form a tissue homogenate containing cytobiotic globulins;
   eluting said tissue homogenate with a citrate solution having a pH of about 3.1 to yield a protein solution;
   precipitating impurities from said protein solution by treating it at a pH of about 6 to separate a first pre- cipitate from said solution;

raising the pH of supernatant liquid to 7;

adding to said supernatant solution ammonium sulfate to form a second precipitate;

separating a globulin-containing solution from the latter;

dialyzing said globulin-containing solution to eliminate ammonium salt therefrom; and extracting the cytobiotic globulin from the dialyzed globulin-containing solution, said skin tissue being macerated and washed in an aqueous solution containing 0.9% by weight sodium chloride for a period of about 1 hour, recovered from said aqueous solution, and washed with distilled water until free from water-soluble salts to form macerated tissue;

said macerated tissue being eluted with a citrate solution having a pH of about 3.1 to yield an elution solution;

the elution solution being brought to a pH of about 6 with sodium hydroxide whereby said first precipitate is formed, the first precipitate being removed by filtration;

the filtrate being brought to a pH of about 7 with sodium hydroxide and about 1.85 M aqueous ammonium sulfate being added to form said second precipitate;

said second precipitate being dissolved in only sufficient distilled water for complete solubilization to yield globulin-containing solution;

said globulin-containing solution being dialyzed against distilled water to complete disappearance of the ammonium salt with formation of a further precipitate;

the further precipitate being separated from the dialyzed eluate, the dialyzed eluate being brought to a PH of about 6.3 with sodium monophosphate and passed through a diethylaminomethylcellulose column; and the eluate being lyophilized after traversing said column.

* * * * *